Nov. 18, 1947.  S. SCHNELL  2,430,955
CONTROL FOR HYDRAULIC BRAKE FLUID
Filed July 24, 1944
FIG. 2.
FIG. 1.
FIG. 3.
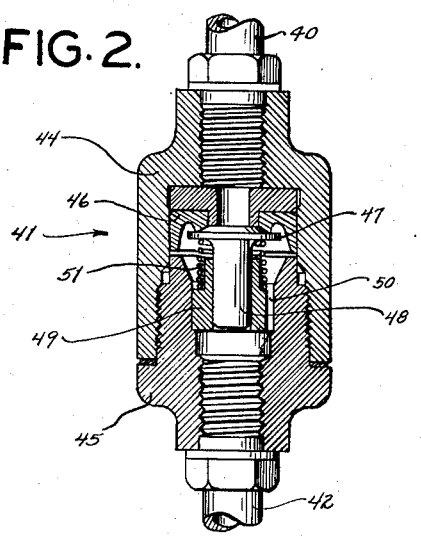
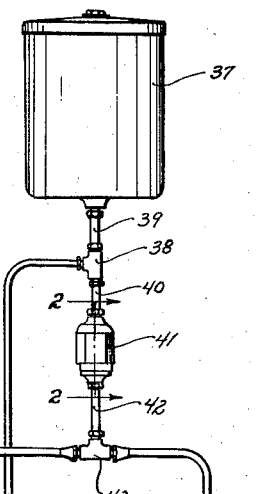
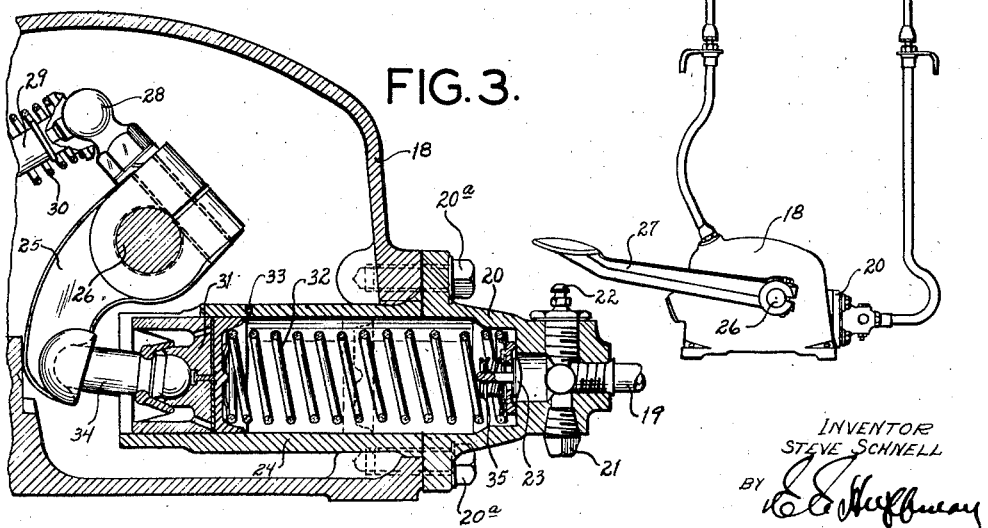
INVENTOR
STEVE SCHNELL
BY
ATTORNEY.

Patented Nov. 18, 1947

2,430,955

UNITED STATES PATENT OFFICE 2,430,955

CONTROL FOR HYDRAULIC BRAKE FLUID

Steve Schnell, Kirkwood, Mo., assignor to Wagner Electric Corporation, St. Louis, Mo., a corporation of Delaware Application July 24, 1944, Serial No. 546,303

6 Claims. (Cl. 188—151)

This invention relates to brake controls and in its more specific aspects is directed to a mechanism whereby the line of conduit between the master cylinder and the brake operating motor is kept filled with liquid.

One of the objects of this invention is to provide a valve in a conduit line in a brake control for maintaining the said conduit which is connected between the master cylinder and the brake operating motor filled with liquid.

A further object of the invention is to provide means in a hydraulic brake system to eliminate the ingress of air into the pressure fluid line connecting the master cylinder and brake operating motor.

A still further object of the invention is to reduce the necessity of frequently bleeding the pressure fluid lines at the brake motor in a hydraulic brake system.

A still further object of the invention is to provide in a hydraulic brake system, a check valve connectable between the elevated pressure fluid supply tank and the conduit connecting the master cylinder and brake motor that is openable when a vacuum is created in said line and is closable when pressure is applied in said conduit.

Another and still further object of the invention is to provide a control system for maintaining the pressure fluid conduit connected between the master cylinder and the brake operating motor filled with liquid under all conditions of operation.

Another and still further object of the invention is to prevent the formation of air pockets in the pressure fluid conduit of a hydraulic brake caused by changes in volume of fluid in said conduit because of temperature and other variations.

Another and still further object of the invention is the provision in a hydraulic brake of a valve for controlling the flow of liquid from an elevated supply tank to the principal pressure fluid conduit in which the valve is openable by a vacuum created in the principal pressure fluid conduit caused by changes in volume of liquid therein on account of temperature or other variations.

Other and further objects of the invention will occur to those skilled in the art to which this invention pertains as the description proceeds, which, taken in connection with the accompanying drawings, sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawings:

Figure 1 shows a schematic outline of the hydraulic brake system;

Figure 2 is a sectional view taken substantially along the line 2—2 of Figure 1; and Figure 3 shows a cross-sectional view of a portion of the master cylinder.

Hydraulic brakes are variously provided with different types of mechanism for bleeding air from the conduits connecting the master cylinder and the brake operating motor or brake cylinder which is usually located on the brake operating motor thereby enabling any entrapped air contained in the motor or in the conduit leading from the master cylinder to be exhausted therefrom. The presence of air or gases in the motor or in the associated conduit renders the operation of the brake faulty and unreliable. While the art contains various devices for bleeding the entrapped air from the brake system, this invention has for its principal purpose the provision of mechanism that will prevent the ingress of air into the braking system, once the system has been cleared of the air which was present when installed.

The above objects and advantages are achieved in the structure set forth in the accompanying drawings in which 1 is the supporting base of a brake assembly customarily employed with an overhead traveling crane or may be employed in a portable or stationary hoist and includes a drum or similar element 2 suitably rotatably mounted on the base 1. A pair of brake arms 3 and 4 are pivoted to the base 1 at 5 and 6 and have pivotally supported thereon brake shoes 7 and 8 and associated friction elements on pivots 9 and 10. An operating arm 11 is pivotally supported on one end of brake arm 4 by pin 12′ and the other end of operating arm 11 is maintained in its lower position by means of a spring 13 connected to the free end of operating arm 11 with the other end of the spring (not shown) being appropriately connected to the base 1. The brake motor or cylinder 12 is pivoted to arm 3 and the opposite end of the motor is engageable with the free end of arm 11. The rod 14 is pivoted to arm 3 by means of pin 15 and its other end is slidably adjustably connected to the curved or hooked end of arm 11 by means of nut elements 16 and 17. This brake structure is conventional in the art and is normally disengaged, spring 13 opening or removing the pressure of the brake shoes from the drum. The brake motor 12 tilts arm 11 about pin 12', thereby drawing arms 3 and 4 toward the brake drum 2 through the medium of rod 14, thereby applying the brake shoes and their associated friction lining elements against the drum to stop any rotation thereof.

The brake motor 12 is connected to master cylinder 18 by means of a conduit 19. The conduit 19 has suitable flexible linkages therein to permit relative movement between the different parts thereof. Conduit 19 is connected to the exhaust fixture 20 secured to the master cylinder 18 by screws 20a, which fixture has a drain plug 21 located on one side thereof and a bleeder valve 22 diametrically disposed from the drain plug 21 in fixture 20. The exhaust side of master cylinder 18 is provided with a check valve 23 that is openable by pressure fluid, acting against spring 35, placed under compression in the cylinder device 24 when crank 25 is pivoted about shaft 26 by means of a foot pedal or lever 27 acting on piston 31. Crank 25 has a ball extension 28 secured thereto engageable with an appropriate socket formed in a rod 29 which is urged to the right by means of a spring 30 when pressure is released from the foot pedal or lever 27. Piston 31 is slidable in the cylinder 24 and spring 32 therein urges the piston to the left in cooperation with spring 30 upon release of the pressure from the foot pedal or lever 27. The master cylinder 18 is normally filled with fluid, as will be subsequently set forth, and liquid is admitted into cylinder 24 through duct 33 when the piston is in its retracted position. A suitable linkage 34 is connected between piston 31 and arm 25 such that axial motion may be applied to piston 31 from the rotative motion of shaft 26 and crank arm 25. Valve 23 maintains liquid in conduit 19 under a predetermined pressure, an expedient well known in the arts. The master cylinder device 18 is intended to include the entire unit of reservoir surrounding the cylinder 24 within same and the cylinder 24 taken alone without regard to the reservoir in which it may be located.

Conduit 36 is connected between the master cylinder 18 and supply tank 37 with a T-connection 38 interposed between the supply tank and the master cylinder. Fluid will flow from the supply tank 37 to the master cylinder 18 through conduit 36 and to complete the connection, a conduit 39 is inserted between the supply tank 37 and T-connection 38. A conduit connection 40 is provided between the T-connection 38 and check valve 41, the exhaust side of which is connected by means of conduit 42 to T-connection 43 inserted in conduit 19. Master cylinder 18 is thereby kept filled at all times by fluid flowing from tank 37 thereto through conduit 36.

The valve 41 comprises a casing 44 which is counterbored and into one end of which a fitting 45 is inserted which receives conduit 42. Conduit 39 is connected to casing 44, thereby completing the connection between conduit 19 and the supply tank 37 and conduit 36. The valve housing 44 is provided with an appropriate valve seat 46 that is engageable by a valve 47 whose stem 48 is slidably received within a slotted fixture 49 having a slot 50 therein permitting the passage of fluid from conduit 39 to conduit 42 when the valve has been opened. Valve 47 is urged into engagement with seat 46 by means of a light spring 51 and is of such strength that ordinary gravitational action will cause valve 47 to become disengaged from seat 46 whenever a vacuum is created in conduit line 19.

Valve 41 is located near supply tank 37 to cause valve 41 to open before the valve in the master cylinder opens. The column of liquid in conduit 36 will be balanced against the liquid in conduits 19 and 42, thereby making the difference in column heights the effective pressure acting on valve 44 and tending to reduce the likelihood of leakage of air in the conduit 19 through brake motor 12. The packing cup (not shown) in the brake motor 12 will, therefore, be required to support only a small column as compared to the large column if conduit 36 were not present.

In traveling crane installations it frequently occurs that the brake and its operating motor are located at a considerable height or distance above the master cylinder 18 and changes in temperature will cause an appreciable change in volume of liquid present in conduit 19, thereby creating a vacuum in said conduit whenever this condition occurs. Under ordinary conditions air would gain ingress to conduit 19 through the brake motor 12 but with valve 41 inserted in the brake system, as shown in Figure 1, it will allow liquid to fill any vacuum created in the conduit line 19. The valve 47, upon the creation of such vacuum, will be opened against the action of spring 51 permitting liquid from elevated tank 37 to flow past valve 47 into conduit 19 filling the same and preventing the entrance of air into said conduit 19, thereby obviating the necessity of frequent bleeding of air from the principal pressure conduit 19.

In the event air or other gases gain access to conduit 19 or the brake motor 12, a bleeder valve 52 is provided on the brake motor to bleed any air or other gases that may possibly have entered said conduit or motor.

The elevated tank 37 may in some instances be located at a level lower than the master cylinder 18 and pressure may then be applied to the liquid in the tank sufficient to approximate the condition shown in the drawing.

Having fully described my invention, that which I claim as novel and desire to protect by Letters Patent of the United States is:

1. In a brake control, a brake; a pressure fluid motor to operate said brake; a master cylinder; a reservoir associated with said master cylinder; a first conduit connecting said motor and said master cylinder; an elevated liquid supply tank; a second conduit connecting said tank and said reservoir; and means to permit fluid to flow into said first conduit from said tank when a vacuum is created in said first conduit.

2. In a brake control, a brake; a pressure fluid motor to operate said brake; a master cylinder; a reservoir associated with said master cylinder; a first conduit connecting said motor and said master cylinder; a liquid supply tank for said master cylinder; a second conduit connected between said tank and said reservoir; and means to keep said first conduit filled with liquid when a vacuum is created in said first conduit, which includes a check valve that allows liquid to flow from said tank to said first conduit but prevents fluid from flowing from said first conduit into said tank.

3. In a brake control, a brake; a motor to operate said brake; a master cylinder including a check valve; a reservoir associated with said master cylinder; a first conduit connecting said master cylinder; said check valve maintaining a predetermined pressure in said first conduit; a liquid supply tank disposed a distance above said brake motor and said master cylinder; a second conduit connected between said supply tank and said reservoir; and means including a check valve vacuum operated to fill said first conduit from said supply tank whenever a vacuum is created in said first conduit.

4. A brake control system comprising a brake actuating motor; a master cylinder; a brake fluid reservoir associated with said master cylinder; a tank for brake fluid disposed above said master cylinder; a first conduit connecting said motor and said master cylinder; a second conduit connecting said tank and said reservoir; and a check valve connected between said tank and said first conduit to permit fluid to flow from said tank to said first conduit to maintain said first conduit filled with brake fluid when said master cylinder is inoperative.

5. A brake control system comprising a brake actuating motor; a master cylinder; a brake fluid reservoir associated with said master cylinder; a tank for brake fluid disposed above said master cylinder and said motor; a first conduit connecting said motor and said master cylinder; a second conduit connecting said tank and said reservoir; and a check valve connected between said tank and said first conduit to permit fluid to flow from said tank to said first conduit.

6. A brake control system comprising a brake actuating motor; a master cylinder; a brake fluid reservoir associated with said master cylinder; a tank for brake fluid disposed above said master cylinder and said motor; a first conduit connecting said motor and said master cylinder; a second conduit connecting said tank and said reservoir; and a check valve connected between said tank and said first conduit to permit fluid to flow from said tank to said first conduit when fluid in said first conduit contracts because of temperature variations in the fluid in said first conduit.

STEVE SCHNELL.

REFERENCES CITED

The following references are of record in the file of this patent:

UNITED STATES PATENTS

| Number | Name | Date |
|---|---|---|
| 1,781,869 | Bragg et al. | Nov. 18, 1930 |
| 2,199,863 | Wehr | May 7, 1940 |
| 568,736 | Brown | Oct. 6, 1876 |
| 2,368,659 | Heineck | Feb. 6, 1945 |
| 2,321,479 | Freeman | June 8, 1943 |
| 2,328,637 | Freeman | Sept. 7, 1943 |